United States Patent Office 3,226,131
Patented Dec. 28, 1965

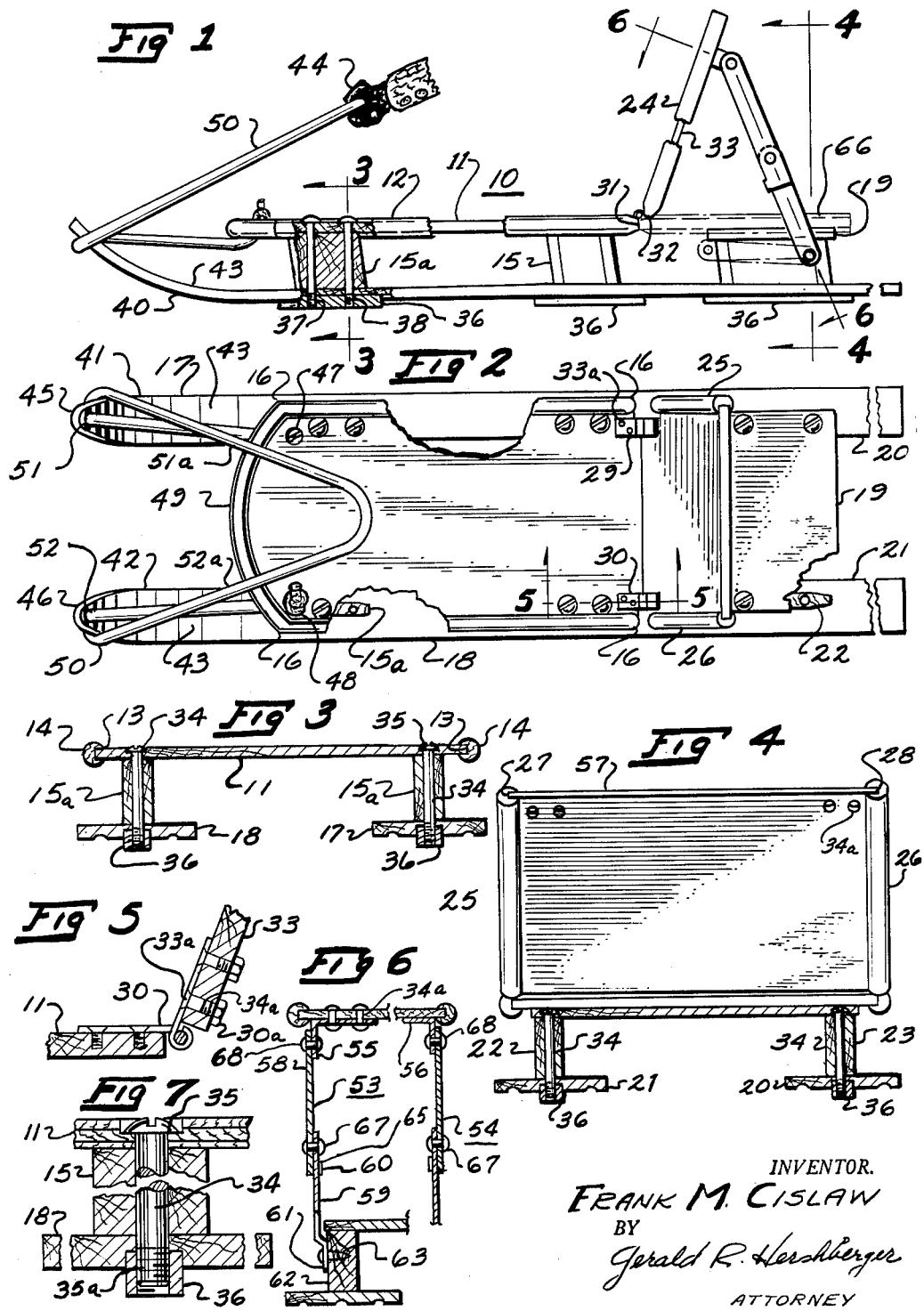

3,226,131
SKI SLED
Frank M. Cislaw, 5380 Briarcliff Knoll,
Birmingham, Mich.
Filed May 20, 1963, Ser. No. 281,463
4 Claims. (Cl. 280—22)

This invention relates to sleds, and more particularly to sleds adapted for coasting.

It is therefore an object of this invention to provide a ski sled with independently suspended ski type runners which may be individually flexed by the person riding on the sled to provide directional steering thereof while coasting over snow.

It is a further object of this invention to provide a convertible sled having a unique hinged seat back contiguous with a main riding platform and a foot platform cooperating with the seat back to provide either a two-rider sled having one rider sitting on the main platform, and a second rider standing on the foot platform, or a long flat platform suitable for prone sledding when the seat back is lowered.

It is a further object of this invention to provide a unique steering arrangement to direct the ski sled.

It is a further object of this invention to provide a unique ski sled fastening arrangement adapted to securely connect the ski sled runners and sled platform together and simultaneously guide the ski runners through snow.

It is a further object of this invention to provide unique, strong, but light, compact structured arrangement for a sled.

Other objects will, from the description, be apparent to those skilled in the art. The present disclosure illustrates an embodiment of the invention and represents the best means I have thus far devised in reducing the invention to practice. It is to be understood that the structural details shown and described shall not constitute limitations inconsistent with the scope of the invention as claimed.

FIGURE 1 is a side elevation of the ski sled.
FIGURE 2 is a top plan view thereof.
FIGURE 3 is a vertical section of the ski sled taken on line 3—3 of FIGURE 1.
FIGURE 4 is a rear end view taken in direction of arrows on line 4—4 of FIGURE 1.
FIGURE 5 is an enlarged sectional view of the seat back hinge arrangement taken on line 5—5 of FIGURE 2.
FIGURE 6 is a vertical section illustrating the seat back hinge arrangement taken on line 6—6 of FIGURE 1.
FIGURE 7 is an enlarged sectional view of the guide bar, riser, and platform fastening means.

The sled construction as disclosed in the accompanying drawings has been used and tested under conditions calculated to uncover defects therein and has been found to endure abuse and perform in a very satisfactory manner.

Conventional coasting sleds are unsuitable for deep or soft snow since the narrow runners readily cut through the snow bogging down the sled and rider. Although sleds provided with long flat runners have been previously devised, these sleds are not adapted for coasting because no steering means has been provided whereby the operator may steer the sled while riding thereon.

Referring to the drawing, the sled is generally denoted by the numeral 10. The sled comprises a primary forward platform 11 of generally rectangularly outlined flat laminated wood. Said platform 11 is provided with a wooden moulding 12 extending about the periphery of said platform by means of a groove 13 cut therein to facilitate gluing to the outside edges of platform 11. The outside contour 14 of said moulding is rounded to prevent injury in the event of the sled striking a person. Four riser members 15 of uniform height are mounted beneath said platform 11 at opposite corners 16 thereof. The riser members then rest on the ski runners 17 and 18 along their lengths supporting the platform in spaced relationship to said ski runners. Rearwardly of the primary platform 11 an auxiliary foot platform 19 of generally rectangularly outlined flat laminated wood is connected to the trailing ends 20 and 21 of ski runners 17 and 18 immediately aft of the primary platform 11 by riser members 22 and 23. Said riser members 22 and 23 are of less height than riser members 15; for a reason to become later apparent. A seat back 24 also constructed of generally rectangularly outlined flat laminated wood, having mouldings 25 and 26 contiguous with moulding 12 mounted on the outside edges 27 and 28 thereof, is hinged by spaced hinges 29 and 30 to the rearward edge 31 of primary platform 11 and likewise to the lower edge 32 of said seat back so that said seat back may be raised and lowered. When said seat back is lowered, the top of platform 19 is calculated to engage the underside 33 of seat back 24 to support said seat back in a horizontal position level with primary platform 11 to provide a long continuous platform adapted for prone position coasting.

To fasten the riser members, platforms, and ski runners securely together, a unique combination of guide and fastening means is employed; round slot headed bolts 34 are extended completely through the platforms 11 and 19 and risers 15, 22, and 23 with the flat, shoulders 35 thereof engaging the top of platform 11. The threaded ends of said bolts are screwed into steel guide bars 36. Two spaced bolts 34 are provided for each bar and riser. The bars 36 are elongated and lie centrally underneath and parallel lengthwise to the ski runners 17 and 18. Two threaded holes 37 and 38 are uniformly spaced lengthwise along each bar. When the bolts 34 are threaded into said threaded holes 36 and 37 and tightened, the platforms, risers, and runners, are clamped tightly together and resist the stresses resulting from the bumps and jars accompanying downhill and other coasting use. The elongated guide bars 36 also prevent the skis from sliding laterally on the snow when coasting. The ski runners 17 and 18 comprise a pair of generally symmetrical, long, thin strips, including an inside wide flat face portion connected to the riser members and turned towards the platform 11 and seat back 24 when said seat back is in lowered position, the corresponding opposite wide flat outside face portion 40 simultaneously engaging a snow surface to provide substantial support, said runner strips being extended forwardly of said primary platform 11 and bowed upwardly and forwardly of said risers 15 to define independently suspended cantilever beam portions 41 and 42 with the inside face portion 43 of each of said cantilever beam portions continuing to be turned towards said platform 11 and the outside face 40 thereof paralleling its corresponding inside face to facilitate riding over encountered snow, the thickness of each said cantilevered portion being estimated to permit independent flexing thereof upwardly and towards said primary platform 11 when a force from a manual source 44 is applied alternatively to the free extreme tips 45 and 46 of said cantilevered portions. The application of a manual force to said cantilevered portions is facilitated by two openings 47 and 48 provided in opposite sides of the forward arcuately curved edge 49 of said primary platform. A lead line 50 is knotted at one end and threaded through one of said openings 47. An opening 51 is provided in a corresponding ski tip 45, and the lead line threaded through said opening. The free end of the lead line 50 is then threaded through the opening 52 provided in the opposite ski tip 46 and then through opening 48 in platform 11. The lead line 50 is then knotted at the free end to prevent the lead line from slipping through the openings. Enough slack is provided in the lead line 50 so that a person sitting on the sled 10 may grasp the lead line comfortably in one hand. The operator, may, by alternatively pulling on the right side of the lead line, flex a corresponding cantilevered beam portion turning the sled to the right, and by alternatively pulling the lead line on the opposite cantilevered portion, flex same turning the sled to the left.

The fastening of lead line 50 to the front edge 49 of primary platform 11 and then through openings 47 and 48 in the ski tips adds rigidity to the cantilevered portions when the lead line is pulled, and improves leverage and stability in steering the sled.

To support the seat back 24 in angular sitting position a pair of toggle braces 53 and 54 are provided. At the end of each brace, right angle brackets 55 and 56 are secured to the outside edges 27 and 28 of the seat back 24 adjacent the rearward edge 57. Toggle link 58 is pivotably connected to said angle bracket 55, a second link 59 is pivotally connected to the opposite end 60 of link 58 and the opposite end 61 of link 59 is pivotally connected to outside surface 62 of riser 22 by means of screw 63. Toggle brace 54 is constructed symmetrically opposite to brace 53 and mounted on the opposite side of seat back 24 and auxiliary platform 19 in the same manner as for brace 53. A stop 65 provided on link 58 to prevent the links 58 and 59 from traveling excessively past center when the seat back 24 is raised. When said seat back is in raised position, said links assume a substantially straight line position slightly past center and the seat back is prevented from rotating to flat position; but when said links are pivoted towards the front of the sled about pivot 67, the seat back 24 is lowered to the position indicated by the dotted lines 66 in FIGURE 1 and said links are concealed beneath the seat back along the sides of risers 22 and 23.

I claim:
1. In a sled for coasting, including a forward primary platform for carrying a rider thereon,
   a pair of sled runner members equidistantly disposed beneath said platform located parallel lengthwise to each other, with the trailing ends thereof extending aft of said forward platform,
   a seat back carried adjacent and rearwardly of said primary platform hinged to lie horizontal in lowered position level with the primary platform to form a long generally flat contiguous platform in response with said primary platform for prone coasting by the rider thereof,
   an auxiliary foot platform means supported fixedly on said trailing runners immediately aft and directly beneath said seat back to support said seat back in said horizontal position when said seat back is lowered,
   and means to secure said seat back in an angular raised position with respect to the riding surface of said primary platform to support the back of a sitting rider, said foot platform being exposed when said seat back is in said raised position to permit a second rider to stand on said platform rearwardly of the sitting rider.

2. In a sled for coasting, including a forward primary platform for carrying a rider thereon,
   a pair of elongated, substantially flat, relatively thin-sectioned, ski runner strips equidistantly spaced beneath said primary platform parallel lengthwise to each other and said platform, with the portion of each strip beneath said primary platform extending rearwardly of said platform and having its inside generally wide, flat top face turned towards the platform and its corresponding opposite outside generally wide flat bottom face turned towards the snow, said outside faces having sufficient surface area to support a rider on snow,
   riser means interposed between said primary platform and said runner strips to fixedly connect said platform in spaced relationship with said ski runner to carry the rider a safe distance above the snow when coasting, said wide flat top face of said runner strips being etxended forwardly of said platform and bowed upwardly of said riser means to define an independently suspended self-sustaining cantilever beam runner portion with the wide inside top face of said runner strips continuing to be turned towards said platform in its bowed position to facilitate flexing thereof upwardly and towards said platform about the relatively thin cross-section thereof when a force from a manual source is applied to the free extreme tip of said cantilevered portion,
   a seat back carried adjacent and rearwardly of said primary platform hinged edgewise to said primary platform to lie horizontal in lowered position level with said primary platform for conversion into a long generally flat contiguous riding platform suitable for prone position coasting,
   an auxiliary foot platform means supported fixedly to and spanning said trailing runner strips portions immediately aft and directly beneath said seat back to support said seat when said seat back is in lowered position,
   and linkage means connected to said seat back and to said foot platform means to secure said seat back in angular raised position with respect to the riding surface of said primary platform for supporting the back of a sitting rider, said foot platform being exposed when said seat back is in raised position to permit a second rider to stand on said platform rearwardly of a sitting rider.

3. In a ski sled for coasting, including a platform for carrying a rider thereon,
   a pair of elongated substantially flat, relatively thin-sectioned, ski runner strips equidistantly spaced beneath said platform with the portion of the runner strip beneath the platform having its inside generally wide flat top face turned towards the platform and its corresponding opposite outside generally wide bottom face turned downwardly and having sufficient surface area to support a rider on snow,
   riser means interposed between said platform and said ski strips of suitable depth to fixedly connect said platform in spaced relationship with said ski strips to carry a human rider a safe distance when propelled over a snow surface, said strips being extended forwardly of said platform and bowed upwardly of the horizontal and forwardly of said riser means to define independently suspended self-sustaining cantilever beam portions with the wide top face of each of said strips continuing to be turned towards said platform and the corresponding outside face thereof paralleling the corresponding inside face to facilitate flexing about the relatively thin cross-section thereof, the cross-sectioned area of each of said cantilevered portions being calculated to permit independent flexing thereof upwardly and towards said platform when a manually exerted force is applied alternatively to the free extreme ends of said cantilevered portions, and steering means including fastening elements oppositely disposed on the forward edge of said platform above a corresponding runner, opening elements provided in the tips of said cantilevered portions adjacent the end thereof, and a continuous lead line fixedly connected at one end thereof to a fastening element and threaded through an opening element adjacent the same runner, thence directly threaded through the opening element in the opposite ski tip and thence to a fastening element where the remaining end of said lead is fixedly fastened thereto, with enough slack provided in the length of said lead line so that the lead line may be looped rearwardly towards the platform and the rider on the sled may grasp the lead comfortably and by alternatively pulling on opposite sides of the lead line cause said line to slip in a corresponding tip opening element to raise or lower said tip and cantilevered portion thereof to cause said sled to change direction.

4. The invention as set forth in claim 3 including a seat back carried adjacent and rearwardly of said platform hinged to lie horizontal in lowered position level with said platform to form a long generally flat contiguous surface for prone coasting by the rider thereof, an auxiliary foot platform means supported fixedly on said trailing runners immediately aft and directly beneath said seat back to support said seat back in said horizontal position when said seat back is lowered, and means to secure said seat back in an angular raised position with respect to the riding surface of said platform to support the back of a sitting rider, said foot platform being exposed when said seat back is in raised position to permit a second rider to stand on said platform rearwardly of the sitting rider.

References Cited by the Examiner

UNITED STATES PATENTS

| 2,095,951 | 10/1937 | Andrus | 280—12 |
| 2,357,928 | 9/1944 | Bowen et al. | 280—22 |

FOREIGN PATENTS 40,537   4/1916   Sweden.

ARTHUR L. LA POINT, *Primary Examiner.*